(12) United States Patent
Zhan et al.

(10) Patent No.: US 10,139,682 B2
(45) Date of Patent: Nov. 27, 2018

(54) RUBBING ALIGNMENT EQUIPMENT

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Chengyong Zhan, Beijing (CN); Kai Wang, Beijing (CN); Cong Tan, Beijing (CN); Bo Zhang, Beijing (CN); Liangliang Jiang, Beijing (CN)

(73) Assignees: BOE Technology Group Co., LTD., Beijing (CN); Hefei Xinsheng Optoelectronics Technology Co., LTD, Hefei, Anhui (CN)

( * ) Notice: Subject to any disclaimer, the term of this patent is extended or adjusted under 35 U.S.C. 154(b) by 285 days.

(21) Appl. No.: 15/098,496

(22) Filed: Apr. 14, 2016

(65) Prior Publication Data
US 2016/0327833 A1 Nov. 10, 2016

(30) Foreign Application Priority Data
May 7, 2015 (CN) .......................... 2015 1 0230184

(51) Int. Cl.
*G02F 1/13* (2006.01)
*G02F 1/1337* (2006.01)
(Continued)

(52) U.S. Cl.
CPC .......... *G02F 1/133784* (2013.01); *D03D 1/00* (2013.01); *D03D 15/00* (2013.01);
(Continued)

(58) Field of Classification Search
CPC ............... G02F 1/1337; G02F 1/13378; G02F 1/133784; G02F 1/1303; D06B 19/0005;
(Continued)

(56) References Cited

U.S. PATENT DOCUMENTS 3,508,589 A * 4/1970 Burton ................... D02G 3/441
139/420 R
5,764,326 A * 6/1998 Hasegawa ......... G02F 1/133753
349/124
(Continued)

FOREIGN PATENT DOCUMENTS

CN 1991522 A 7/2007
CN 100562777 C 11/2009
(Continued)

OTHER PUBLICATIONS

First Office Action dated Apr. 27, 2017 corresponding to Chinese application No. 201510230184.5.

*Primary Examiner* — Jason L Vaughan
(74) *Attorney, Agent, or Firm* — Nath Goldberg & Meyer; Joshua B. Goldberg

(57) ABSTRACT

The invention provides a rubbing alignment equipment, which belongs to the field of rubbing alignment technology and can solve the problem of badness of an alignment film during rubbing alignment due to the badness of the existing rubbing cloth. The rubbing alignment equipment of the invention comprises a rubbing roller, which comprises a roll shaft and rubbing cloth wound on the outer surface of the roll shaft, the rubbing cloth is doped with quantum dots, the rubbing alignment equipment further comprises an excitation light source, which can excite the quantum dots to emit light to detect whether the surface of the rubbing cloth has badness or not. The rubbing alignment equipment can well detect whether the rubbing cloth has badness or not.

14 Claims, 1 Drawing Sheet

(51) Int. Cl.
*D06B 19/00* (2006.01)
*D03D 1/00* (2006.01)
*D03D 15/00* (2006.01)

(52) U.S. Cl.
CPC ........... *D06B 19/00* (2013.01); *G02F 1/1303* (2013.01); *D10B 2403/01* (2013.01); *D10B 2505/00* (2013.01)

(58) Field of Classification Search
CPC .............. D06B 19/0064; D06B 19/007; D03D 1/0076; D03D 1/0088; D03D 15/00
USPC ......... 492/57, 59, 60, 51, 52, 53, 48, 28, 29
See application file for complete search history.

(56) References Cited

U.S. PATENT DOCUMENTS

| | | | | |
|---|---|---|---|---|
| 5,879,497 | A * | 3/1999 | Nakahara | G02F 1/133784 156/295 |
| 6,219,123 | B1 * | 4/2001 | Naito | G02F 1/133784 349/126 |
| 6,313,897 | B1 * | 11/2001 | Murayama | G02F 1/133784 349/123 |
| 7,742,144 | B2 * | 6/2010 | Song | G02F 1/133784 349/126 |
| 2001/0017682 | A1 * | 8/2001 | Kim | G02F 1/133784 349/124 |
| 2004/0189912 | A1 * | 9/2004 | Lee | G02F 1/133784 349/125 |
| 2005/0067042 | A1 * | 3/2005 | Hirota | D03D 27/06 139/426 R |
| 2005/0136768 | A1 * | 6/2005 | Huang | A43B 1/0036 442/301 |
| 2005/0252568 | A1 * | 11/2005 | Huang | D03D 1/0088 139/420 A |
| 2006/0222782 | A1 * | 10/2006 | Takei | G02F 1/1309 428/1.1 |
| 2007/0153183 | A1 * | 7/2007 | Choi | G02F 1/1303 349/124 |
| 2008/0002137 | A1 * | 1/2008 | Kim | G02F 1/1303 349/187 |
| 2011/0269358 | A1 * | 11/2011 | Peng | D03D 1/0088 442/59 |
| 2012/0302414 | A1 * | 11/2012 | Prushinskiy | G02F 1/133784 492/51 |
| 2013/0008622 | A1 * | 1/2013 | Abraham | D21F 1/0027 162/358.2 |

FOREIGN PATENT DOCUMENTS

| | | |
|---|---|---|
| CN | 103409084 A | 11/2013 |
| JP | 5241158 A | 9/1993 |
| JP | 9257433 A | 10/1997 |
| JP | 2001249338 A | 9/2001 |
| JP | 2004233443 A | 8/2004 |
| KR | 20030057120 A | 7/2003 |
| KR | 1020110073013 A | 6/2011 |
| WO | 9515487 A1 | 6/1995 |

* cited by examiner

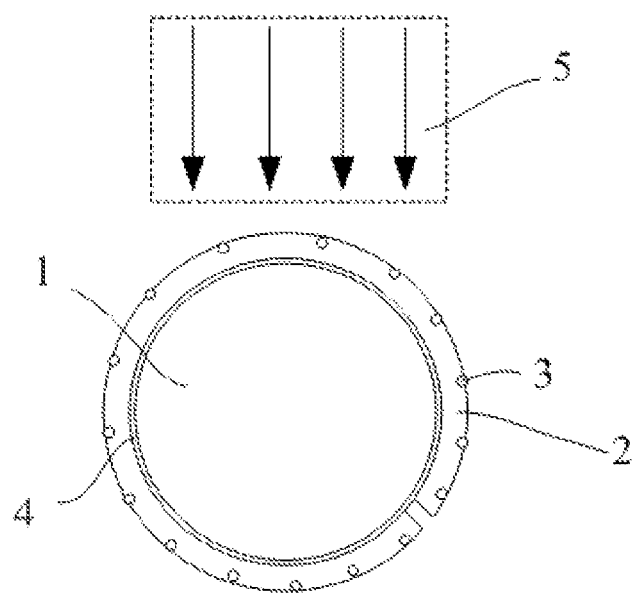

RUBBING ALIGNMENT EQUIPMENT

FIELD OF THE INVENTION

The present invention belongs to the field of rubbing alignment technology, and particularly relates to rubbing alignment equipment as well as rubbing cloth and a manufacturing method thereof.

BACKGROUND OF THE INVENTION

In the liquid crystal display field, normal display of liquid crystal display pictures depends on refraction of light caused by deflection of liquid crystal molecules. In the process of manufacturing a liquid crystal display, liquid crystal molecules need to be arranged in certain directions and angles, namely the liquid crystal molecules need to be aligned. Liquid crystal alignment technologies include a rubbing alignment technology and a non-rubbing alignment technology.

The rubbing alignment process means that a rubbing roller rubs the surface of an alignment film in a certain direction, thus forming grooves for arranging liquid crystal molecules in certain directions and angles. The rubbing roller includes a roll shaft and rubbing cloth attached to the roll shaft. During rubbing, the rubbing cloth directly rubs the alignment film, so the surface condition of the rubbing cloth directly influences the quality of alignment. Generally, the rubbing cloth adopts nylon cloth, fibers or cotton cloth. Then the quality, the weaving technique and the like of the rubbing cloth may directly influence the quality of the rubbing process.

The rubbing cloth is adhered to the rubbing roller by a double-faced adhesive tape. If the rubbing cloth itself is not uniform in thickness or has badness when winding on the roll shaft, e.g. surface protrusion, dust adhered to surface and the like, it may scratch the surface of the alignment film during alignment to influence the quality of pictures.

Thus, before the rubbing cloth is used for alignment, unqualified rubbing cloth should be removed.

Moreover, a large amount of static charges may be generated during the rubbing process and accumulated on the surface of the rubbing cloth. The static charges accumulated on the surface of the rubbing cloth may attract alignment film chips generated in the rubbing process, so that the surface condition of the rubbing cloth is degraded; at cloth slits, the tail end of the rubbing cloth may rise, drop off or the like during rubbing, and these greatly increase the risk of alignment badness.

At present, the rubbing cloth is mainly detected by experiential observation of operators, and the surface condition thereof is judged by experience.

On the other hand, quantum dots are nanoparticles formed by a semiconductor material, and have many unique characteristics due to the size effect thereof. One of the important characteristics is fluorescent effect. The quantum dots emit fluorescence under the irradiation of an excitation light source. The quantum dots is adjustable in color, and have narrow emission spectrum, high photochemical stability and long fluorescence lifetime, and the emission spectrum of the quantum dots can be controlled by changing the size of the quantum dots.

SUMMARY OF THE INVENTION

Technical Problems to be solved by the Invention

As mentioned above, when an operator observes rubbing cloth by experience, the operator needs to carefully observe the surface thereof and thus identifies whether the surface of the rubbing cloth has defects or not, which leads to the problems of time and energy waste, low inspecting efficiency and low inspecting precision. Moreover, because the surface condition of the rubbing cloth may be degraded during a rubbing process, the surface condition of the rubbing cloth is difficult to monitor in real time with the existing inspecting efficiency and inspecting precision.

In order to solve the above problems of the existing rubbing cloth, the present invention provides a rubbing alignment equipment capable of detecting the badness of rubbing cloth and the rubbing cloth.

Solutions for the Problems

One embodiment of the present invention provides a rubbing alignment equipment, comprising a rubbing roller, which comprises a roll shaft and rubbing cloth wound on the outer surface of the roll shaft, the rubbing cloth is doped with quantum dots, the rubbing alignment equipment further includes an excitation light source, which can excite the quantum dots to emit light to detect whether the surface of the rubbing cloth has badness or not.

Preferably, the quantum dots are uniformly distributed in the rubbing cloth.

Preferably, the quantum dots are made of any one of materials selected from cadmium sulfide, cadmium selenide, cadmium telluride and zinc selenide.

Preferably, the particle diameter of the quantum dots is less than 10 nm.

Preferably, the excitation light source is an ultraviolet light source.

Preferably, the rubbing alignment equipment further includes a winding device, which is used for winding the rubbing cloth onto the roll shaft.

Further preferably, the excitation light source is disposed on the winding device, and is used for exciting the quantum dots to emit light to detect whether the surface of the rubbing cloth has badness or not after the winding device winds the rubbing cloth onto the roll shaft.

Preferably, the rubbing alignment equipment further includes a rubbing platform, which is used for bearing a substrate for rubbing alignment.

Further preferably, the excitation light source is disposed on a cross beam on the rubbing platform corresponding to the rubbing roller, and is used for exciting the quantum dots to emit light to detect whether the surface of the rubbing cloth has badness or not when the rubbing roller performs rubbing alignment on the substrate on the rubbing platform.

Preferably, the rubbing cloth and the roll shaft are fixed to each other by a double-faced adhesive tape.

Another embodiment of the present invention provides a rubbing cloth, which is doped with quantum dots, the quantum dots can emit light under the excitation of an excitation light source to detect whether the surface of the rubbing cloth has badness or not.

Preferably, the quantum dots are uniformly distributed in the rubbing cloth.

Preferably, the quantum dots are made of any one of materials selected from cadmium sulfide, cadmium selenide, cadmium telluride and zinc selenide.

Preferably, the particle diameter of the quantum dots is less than 10 nm.

Another embodiment of the present invention provides a manufacturing method of rubbing cloth, comprising a step of adding quantum dots into yarns during weaving of the rubbing cloth.

The present invention has the following advantages:

The rubbing cloth of the present invention is doped with quantum dots which can emit light under the excitation of an excitation light source, and after the rubbing cloth is wound onto the outer surface of the roll shaft, the quantum dots can be lightened by the excitation light source, that is to say, the surface of the rubbing cloth emits light, which is favorable for an operator to observe and detect whether the surface of the rubbing cloth wound onto the roll shaft is flat and has badness or not. Thus, the unqualified rubbing roller can be removed.

Moreover, when the rubbing roller performs rubbing alignment on the alignment film on the substrate, whether the surface of the rubbing cloth has badness or not can be detected. Specifically, in the rubbing alignment process, the quantum dots are lightened by the excitation light source, then the rubbing cloth itself emits fluorescence, and such badness as surface protrusion, dust adhered to surface and the like on the surface of the rubbing cloth is clear and is easily found by the operator, so that the inspecting efficiency and the inspecting precision can be improved, which helps the operator monitor the surface of the rubbing cloth in real time and change bad rubbing cloth in time to reduce alignment badness, meanwhile, the service life of the rubbing cloth can be prolonged, and the cost can be reduced.

BRIEF DESCRIPTION OF THE DRAWINGS

FIG. 1 is a schematic diagram of rubbing alignment equipment in an embodiment of the present invention.

In which, reference numerals: 1, roll shaft; 2, rubbing cloth; 3, quantum dots; 4, double-faced adhesive tape; 5, excitation light source.

DESCRIPTION OF THE PREFERRED EMBODIMENT

In order to make those skilled in the art better understand the technical solutions of the present invention, the present invention will be further described in detail below in combination with the accompanying drawing and specific embodiments.

As shown in FIG. 1, this embodiment provides a rubbing alignment equipment, comprising a rubbing roller, which comprises a roll shaft 1 and rubbing cloth 2 wound on the outer surface of the roll shaft 1, the rubbing cloth 2 is doped with quantum dots 3; the rubbing alignment equipment further includes an excitation light source 5, which can excite the quantum dots 3 to emit light to detect whether the surface of the rubbing cloth 2 has badness or not.

It should be noted that, the quantum dots 3 are nanoparticles formed by a semiconductor material, and have many unique characteristics due to the size effect thereof. One of the important characteristics is fluorescent effect. The quantum dots 3 emit fluorescence under the irradiation of the excitation light source 5. The quantum dots 3 is adjustable in color, and have narrow emission spectrum, high photochemical stability and long fluorescence lifetime, and the emission spectrum of the quantum dots 3 can be controlled by changing the size of the quantum dots 3.

The rubbing cloth 2 of this embodiment is doped with quantum dots 3, meanwhile, the rubbing alignment equipment is additionally provided with an excitation light source 5 capable of exciting the quantum dots 3 to emit light, so that after the rubbing cloth 2 is wound onto the outer surface of the roll shaft 1, the quantum dots 3 can be lightened by the excitation light source 5, that is to say, the surface of the rubbing cloth 2 emits light. Therefore, the surface condition of the rubbing cloth 2 is clear, which is favorable for an operator to observe and detect whether the surface of the rubbing cloth 2 wound onto the roll shaft 1 is flat and has badness or not, the inspecting efficiency and the inspecting precision are improved, and time and manpower are saved. Moreover, when the rubbing roller performs rubbing alignment on an alignment film on a substrate, the operator can find the badness on the surface of the rubbing cloth in time due to the improvement on the inspecting efficiency and the inspecting precision, which is favorable for detecting whether the surface of the rubbing cloth 2 has badness or not in real time. Specifically, a large amount of static charges may be generated during the rubbing alignment process, and the static charges accumulated on the surface of the rubbing cloth 2 may attract alignment film chips generated by rubbing. At slits of the rubbing cloth 2, the tail end of the rubbing cloth 2 may rise, drop off or the like during rubbing, and these greatly increase the risk of alignment badness. Now, the quantum dots 3 are lightened by the excitation light source 5, which helps the operator monitor the surface of the rubbing cloth 2 in real time and change bad rubbing cloth 2 in time to reduce alignment badness, meanwhile, the service life of the rubbing cloth 2 can be prolonged, and the cost can be reduced.

Preferably, the quantum dots 3 are uniformly distributed in the rubbing cloth 2 in this embodiment, so that the flatness of the rubbing cloth 2 can be prevented from being influenced by doping the quantum dots 3 into the rubbing cloth 2 as much as possible.

The methods for doping the quantum dots 3 into the rubbing cloth 2 will be described hereinafter. As a first method, the rubbing cloth is generally fixed on the rubbing roller by gum, and the surface of the gum is manually coated with quantum dots. As a second method, the rubbing cloth is woven by warps and wefts, the warps and the wefts are doped with quantum dots before weaving, and the quantum dots are uniformly distributed in the rubbing cloth after weaving. Thus, the quantum dots 3 can be doped into the rubbing cloth 2. Although the detailed mechanism that the quantum dots can be firmly adsorbed in the rubbing cloth is not quite clear, it is speculated that the rubbing cloth itself generates strong static electricity when rubbing the alignment film, and the peak value of static electricity can reach the level of thousands of volts. At the moment, the nanoscale quantum dots are firmly adsorbed in the rubbing cloth by the static electricity and are difficult to drop off.

Preferably, the quantum dots 3 may be made of any one of materials selected from cadmium sulfide (CdS), cadmium selenide (CdSe), cadmium telluride (CdTe) and zinc selenide (ZnSe) in this embodiment. However, the present invention is not limited thereto, as long as the function of the quantum dots can be realized, for example, organic fluorescent powder such as calcium halophosphate can be used. In specific setting, the quantum dots 3 can be added into yarns when the rubbing cloth 2 is woven. The adding amount of the quantum dots 3 is not specially defined, and can be selected according to fluorescence intensity required in a later stage, mechanical strength of the rubbing cloth and the like. For example, with respect to the rubbing cloth of a unit area, about 0.5 g or 1 g or 1.5 g of quantum dots 3 can be added.

The particle diameter of the quantum dots 3 is not specially limited, but preferably, the particle diameter of the quantum dots 3 is less than 10 nm. When the particle diameter of the quantum dots 3 is less than 10 nm, the flatness of the rubbing cloth 2 can be prevented from being influenced by large size of the quantum dots 3. Meanwhile, when the rubbing cloth performs rubbing alignment on the alignment film, even if the quantum dots drop off from the rubbing cloth, the quantum dots of which the particle diameter is small and less than 10 nm do not influence the alignment film.

Preferably, the rubbing cloth 2 is adhered to the rubbing roller by a double-faced adhesive tape 4, so that the rubbing cloth can be detached from the roller after arriving at the service life. Of course, the rubbing cloth and the rubbing roller can be fixed to each other by adopting acrylic adhesive.

The excitation light source 5 is not specially defined, as long as it can excite the quantum dots 3 to emit fluorescence. The quantum dots luminescence depends on that valence electrons thereof jump from a valence band to a conduction band in an unstable state after absorbing the energy of short wavelength light, and release fluorescent energy when returning back the valence band from the conduction band. The slit width from the valence band to the conduction band is referred to as forbidden band width. Ultraviolet light is short in wavelength and high in energy and is sufficient to provide the energy for valence electron jump, so the excitation light source 5 in this embodiment is preferably an ultraviolet light source. Of course, other light source may also be adopted. It should be noted that, the forbidden band width of the quantum dots can be adjusted by adjusting the shape, structure and size of the quantum dots, and what kind of excitation light source 5 is adopted can be determined according to the category and the three-dimensional size of the selected quantum dots 3.

In an embodiment, the rubbing alignment equipment of the present invention further includes a winding device, which is used for winding the rubbing cloth 2 onto the roll shaft 1. The excitation light source is disposed on the winding device, and is used for exciting the quantum dots 3 to emit light to detect whether the surface of the rubbing cloth 2 has badness or not after the winding device winds the rubbing cloth 2 onto the roll shaft 1.

Specifically, after the rubbing cloth 2 is wound onto the roll shaft 1, various defects may inevitably occur. If the existing rubbing cloth is observed merely by experience of operators, time and energy are wasted, and the inspecting precision is relatively low due to different criteria of various operators. According to the rubbing alignment equipment of this embodiment, the excitation light source 5 is turned on to irradiate the surface of the rubbing cloth 2 for a period of time, and then is turned off. The quantum dots 3 then emit fluorescence, and the badness on the surface of the rubbing cloth 2 is clear in a darkroom environment. Thus, unqualified rubbing rollers can be removed, to prevent unnecessary loss caused by using the bad rubbing cloth 2 in the rubbing alignment process.

As another specific embodiment of this embodiment, the rubbing alignment equipment of this embodiment further includes a rubbing platform, which is used for bearing a substrate for rubbing alignment. The excitation light source is disposed on a cross beam on the rubbing platform corresponding to the rubbing roller, and is used for exciting the quantum dots 3 to emit light to detect whether the surface of the rubbing cloth 2 has badness or not when the rubbing roller performs rubbing alignment on the substrate on the rubbing platform.

Specifically, during the rubbing alignment process, the rubbing cloth 2 may also produce new badness, for example, alignment badness caused by the reasons that the surface attracts alignment film chips, the cloth slits raise and the like. At the moment, the quantum dots 3 are lightened by the excitation light source 5, then the rubbing cloth 2 itself emits fluorescence, and such badness as surface protrusion, dust adhered to surface and the like on the surface of the rubbing cloth 2 is clear and is easily found by the operator, so that the inspecting efficiency and the inspecting precision can be improved, which is favorable for the operator to monitor the surface of the rubbing cloth 2 in real time and find and change bad rubbing cloth 2 in time to reduce alignment badness, meanwhile, the service life of the rubbing cloth 2 can be prolonged, and the cost can be reduced.

It could be understood that, the above embodiments are merely exemplary embodiments adopted for describing the principle of the present invention, but the present invention is not limited thereto. Various variations and improvements could be made for those of ordinary skill in the art without departing from the spirit and essence of the present invention, and these variations and improvements are constructed as falling into the protection scope of the present invention.

The invention claimed is:

1. Rubbing alignment equipment, comprising a rubbing roller, which comprises a roll shaft and rubbing cloth wound on the outer surface of the roll shaft, wherein the rubbing cloth is doped with quantum dots, the rubbing alignment equipment further comprises an excitation light source, which can excite the quantum dots to emit light to detect whether the surface of the rubbing cloth has badness or not.

2. The rubbing alignment equipment according to claim 1, wherein the quantum dots are uniformly distributed in the rubbing cloth.

3. The rubbing alignment equipment according to claim 1, wherein the quantum dots are made of any one of materials selected from cadmium sulfide, cadmium selenide, cadmium telluride and zinc selenide.

4. The rubbing alignment equipment according to claim 1, wherein the particle diameter of the quantum dots is less than 10 nm.

5. The rubbing alignment equipment according to claim 1, wherein the excitation light source is an ultraviolet light source.

6. The rubbing alignment equipment according to claim 1, wherein the rubbing alignment equipment further comprises a winding device, which is used for winding the rubbing cloth onto the roll shaft.

7. The rubbing alignment equipment according to claim 6, wherein the excitation light source is disposed on the winding device, and is used for exciting the quantum dots to emit light to detect whether the surface of the rubbing cloth has badness or not after the winding device winds the rubbing cloth onto the roll shaft.

8. The rubbing alignment equipment according to claim 1, wherein the rubbing alignment equipment further comprises a rubbing platform, which is used for bearing a substrate for rubbing alignment.

9. The rubbing alignment equipment according to claim 8, wherein the excitation light source is disposed on a cross beam on the rubbing platform corresponding to the rubbing roller, and is used for exciting the quantum dots to emit light to detect whether the surface of the rubbing cloth has badness or not when the rubbing roller performs rubbing alignment on the substrate on the rubbing platform.

10. The rubbing alignment equipment according to claim 1, wherein the rubbing cloth and the roll shaft are fixed to each other by a double-faced adhesive tape.

11. Rubbing cloth, wherein it is doped with quantum dots, which are used for emitting light under the excitation of an excitation light source to detect whether the surface of the rubbing cloth has badness or not.

12. The rubbing cloth according to claim 11, wherein the quantum dots are uniformly distributed in the rubbing cloth.

13. The rubbing cloth according to claim 11, wherein the quantum dots are made of any one of materials selected from cadmium sulfide, cadmium selenide, cadmium telluride and zinc selenide.

14. The rubbing cloth according to claim 11, wherein the particle diameter of the quantum dots is less than 10 nm.

* * * * *